US010614850B1

(12) United States Patent
Jones et al.

(10) Patent No.: US 10,614,850 B1
(45) Date of Patent: Apr. 7, 2020

(54) COATING A NEAR FIELD TRANSDUCER WITH A DIELECTRIC MATERIAL FROM MAGNETIC RECORDING MEDIUM

(71) Applicant: SEAGATE TECHNOLOGY LLC, Cupertino, CA (US)

(72) Inventors: Paul M. Jones, Palo Alto, CA (US); Martin Blaber, Minneapolis, MN (US); Xiaoding Ma, Fremont, CA (US); Yuhang Cheng, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/299,360

(22) Filed: Mar. 12, 2019

(51) Int. Cl.
| | |
|---|---|
| *G11B 11/105* | (2006.01) |
| *G11B 11/24* | (2006.01) |
| *C23C 26/00* | (2006.01) |
| *G11B 5/012* | (2006.01) |
| G11B 5/00 | (2006.01) |
| G11B 11/26 | (2006.01) |
| G11B 5/60 | (2006.01) |

(52) U.S. Cl.
CPC ............. *G11B 11/24* (2013.01); *C23C 26/00* (2013.01); *G11B 5/012* (2013.01); *G11B 5/6088* (2013.01); *G11B 11/26* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 7,518,815 | B2 * | 4/2009 | Rottmayer | B82Y 10/00 360/59 |
| 8,395,974 | B1 * | 3/2013 | Shimazawa | G11B 5/3133 369/112.27 |
| 8,902,720 | B1 | 12/2014 | Schreck et al. | |
| 9,036,307 | B1 | 5/2015 | Hoshiya et al. | |
| 9,460,738 | B1 * | 10/2016 | Torres | G11B 5/40 |
| 9,852,749 | B2 * | 12/2017 | Bian | G11B 5/314 |
| 10,083,713 | B1 | 9/2018 | Simmons et al. | |
| 2004/0028869 | A1 * | 2/2004 | Terao | B82Y 10/00 428/64.4 |
| 2010/0054093 | A1 * | 3/2010 | Iwata | B82Y 10/00 369/13.14 |
| 2014/0254334 | A1 * | 9/2014 | Yang | G11B 5/105 369/13.32 |
| 2016/0275974 | A1 * | 9/2016 | Cheng | G11B 5/40 |

* cited by examiner

*Primary Examiner* — Tan X Dinh
(74) *Attorney, Agent, or Firm* — Holzer Patel Drennan

(57) ABSTRACT

Systems and methods for coating a near field transducer in a dielectric material are described. In one embodiment, the method may include forming a liquid solution comprising at least a first dielectric and a disk surface lubricant, forming a coating of the liquid solution on an outer surface of a storage medium based at least in part on dipping the storage medium in the liquid solution, and accumulating a first set of molecules of the first dielectric on a near field transducer (NFT) of a HAMR head based at least in part on evaporating a first portion of the first dielectric in the coating by performing a first HAMR writing operation that shines a laser on the coating.

18 Claims, 7 Drawing Sheets

COATING A NEAR FIELD TRANSDUCER WITH A DIELECTRIC MATERIAL FROM MAGNETIC RECORDING MEDIUM

SUMMARY

The present disclosure is directed to methods and systems for coating a near field transducer (NFT) in a dielectric material. Specifically, the present techniques relate to coating a NFT in a dielectric material to improve a signal to noise ratio associated with the NFT.

A heat assisted magnetic recording (HAMR) storage drive is described. In one embodiment, the HAMR storage drive may include a storage medium, a coating on an outer surface of the storage medium that includes at least a first dielectric and a disk surface lubricant, and a near field transducer (NFT) of a HAMR head. In some cases, a first set of molecules of the first dielectric may be accumulated on the NFT based at least in part on a first portion of the first dielectric in the coating being evaporated by a first HAMR writing operation that shines a laser on the coating.

In some cases, a thickness of the molecules of the first dielectric accumulated on the NFT ranges from about 0.1 nm to about 10 nm. With the present techniques depositing a dielectric on an NFT is self-limiting. For example, the thickness of the molecules of the first dielectric accumulated on the NFT may be limited by a size of an air gap between the NFT and the coating on the outer surface of the storage medium.

In some examples, the HAMR storage drive may include a second set of molecules of the first dielectric accumulated on the first set of molecules based at least in part on evaporating a second portion of the first dielectric in the coating by performing a second HAMR writing operation after the first HAMR writing operation.

In some cases, a refractive index n of the molecules of the first dielectric accumulated on the NFT ranges from about 1.1 to about 2.0. In some examples, an extinction coefficient k of the molecules of the first dielectric accumulated on the NFT ranges from about 0.0 to about 1.0 based at least in part on a material composition used for the first dielectric and a thickness of the first dielectric on the NFT.

In some cases, the coating is formed on the outer surface of the storage medium based at least in part on dipping the storage medium in a liquid solution of the first dielectric and the disk surface lubricant, the forming of the coating occurring before the storage medium is enclosed in a housing of the storage drive.

In some cases, the evaporating of the first portion of the first dielectric occurs after the storage medium is enclosed in the housing. In some examples, a portion of the first dielectric or a second dielectric different from the first dielectric is deposited on the NFT before the storage medium is enclosed in the housing.

In some cases, depositing the portion of the first dielectric or the second dielectric on the NFT before the storage medium is enclosed in a housing is based at least in part on using a vacuum deposition chamber to deposit the portion of the first dielectric or the second dielectric on the NFT while building the HAMR head. Additionally or alternatively, depositing the portion of the first dielectric or the second dielectric on the NFT before the storage medium is enclosed in a housing is based at least in part on depositing (e.g., in a deposition chamber) the portion of the first dielectric or the second dielectric on the NFT as part of post processing of a surface of the HAMR head after building the HAMR head.

In some cases, at least a portion of the first dielectric and the second dielectric is formed from a material composition. In some examples, the material composition may include at least one of $SiO_2$, $Ta_2O_5$, $Nb_2O_5$, $ZrO_2$, $TiO_2$, MgO, AlN, GaN, $Si_3N_4$, SiON, TiON, $ZrO_2$, $Y_2O_3$, and yttria-stabilized zirconia ($ZrO_2/Y_2O_3$).

A method to increase a signal to noise ratio (SNR) of a heat assisted magnetic recording (HAMR) head is also described. In one embodiment, the method may include forming a liquid solution comprising at least a first dielectric and a disk surface lubricant, forming a coating of the liquid solution on an outer surface of a storage medium based at least in part on dipping the storage medium in the liquid solution, and accumulating a first set of molecules of the first dielectric on a near field transducer (NFT) of a HAMR head based at least in part on evaporating a first portion of the first dielectric in the coating by performing a first HAMR writing operation that shines a laser on the coating.

A deposition apparatus for depositing films on heat assisted magnetic recording (HAMR) heads is also described. In one embodiment, the deposition apparatus may be configured to deposit a film of a first portion of a dielectric on a near field transducer (NFT) of a HAMR head before the HAMR head and a storage medium are enclosed in a storage drive housing. In some cases, the deposition apparatus may be configured to accumulate on the film a first set of molecules from a second portion of the dielectric based at least in part on performing a first HAMR writing operation that shines a laser on a coating of the storage medium and evaporates the first set of molecules from the second portion of the dielectric, the second portion of the dielectric being mixed into the coating.

The foregoing has outlined rather broadly the features and technical advantages of examples according to this disclosure so that the following detailed description may be better understood. Additional features and advantages will be described below. The conception and specific examples disclose may be readily utilized as a basis for modifying or designing other structures for carrying out the same purposes of the present disclosure. Such equivalent constructions do not depart from the scope of the appended claims. Characteristics of the concepts disclose herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

The present techniques include various devices that may be used for magnetic recording of data (e.g., heat assisted magnetic recording (HAMR), etc.). Specifically, the present techniques may support increasing a signal to noise ratio (SNR) of a write operation of a HAMR storage drive. In some cases, the present techniques may use a lossless or relatively lossless head to disk interface on a magnetic recording head (e.g., a HAMR recording head). In some cases, the present techniques may include depositing a high optical index dielectric on a near field transducer of the magnetic recording head. In some cases, depositing the dielectric may include a thermal decomposition of the dielectric doped into a lubricant on a surface of a storage medium. In some cases, the deposited dielectric may fill or relatively fill an air gap between the NFT and the storage medium.

In some cases, a lubricant solution that includes the lubricant and a certain concentration of a dielectric is deposited onto the outer surface of a storage medium. As the HAMR writing takes place, desorption (e.g., evaporation) of the dielectric may precede the desorption of the lubricant. In some cases, a high exit velocity of the dielectric from the storage media surface may result in the dielectric accumulating on the NFT region. In some cases, the dielectric may undergo decomposition (e.g., siloxane in the lubricant decomposing to form a thin $SiO_2$ layer on top of the NFT). In some cases, depositing the dielectric on the NFT results in a more efficient coupling of the evanescent wave to the storage media in the HAMR write operation due to the refractive index of deposited dielectric.

In some cases, a dielectric material having a set refractive index may be placed onto the NFT at the time of manufacturing or before assembling the storage drive (e.g., before enclosing the HAMR head and storage medium in a storage drive housing. In some cases, this dielectric layer increases the optical coupling between the NFT and storage media, thereby increasing the recorded signal SNR.

Depositing a dielectric on an NFT at the time of manufacturing and/or based on a HAMR write operation may result in an increase in a thermal gradient within a recording layer of the storage medium during HAMR writing operations. Additionally, depositing a dielectric on an NFT lowers the laser power required to write data in a HAMR write operation. Additionally, depositing a dielectric on an NFT increases the recorded signal SNR. Additionally, depositing a dielectric on an NFT results in a decreased head temperature relative to a storage drive that does not have a dielectric deposited on the NFT.

Figure 1:
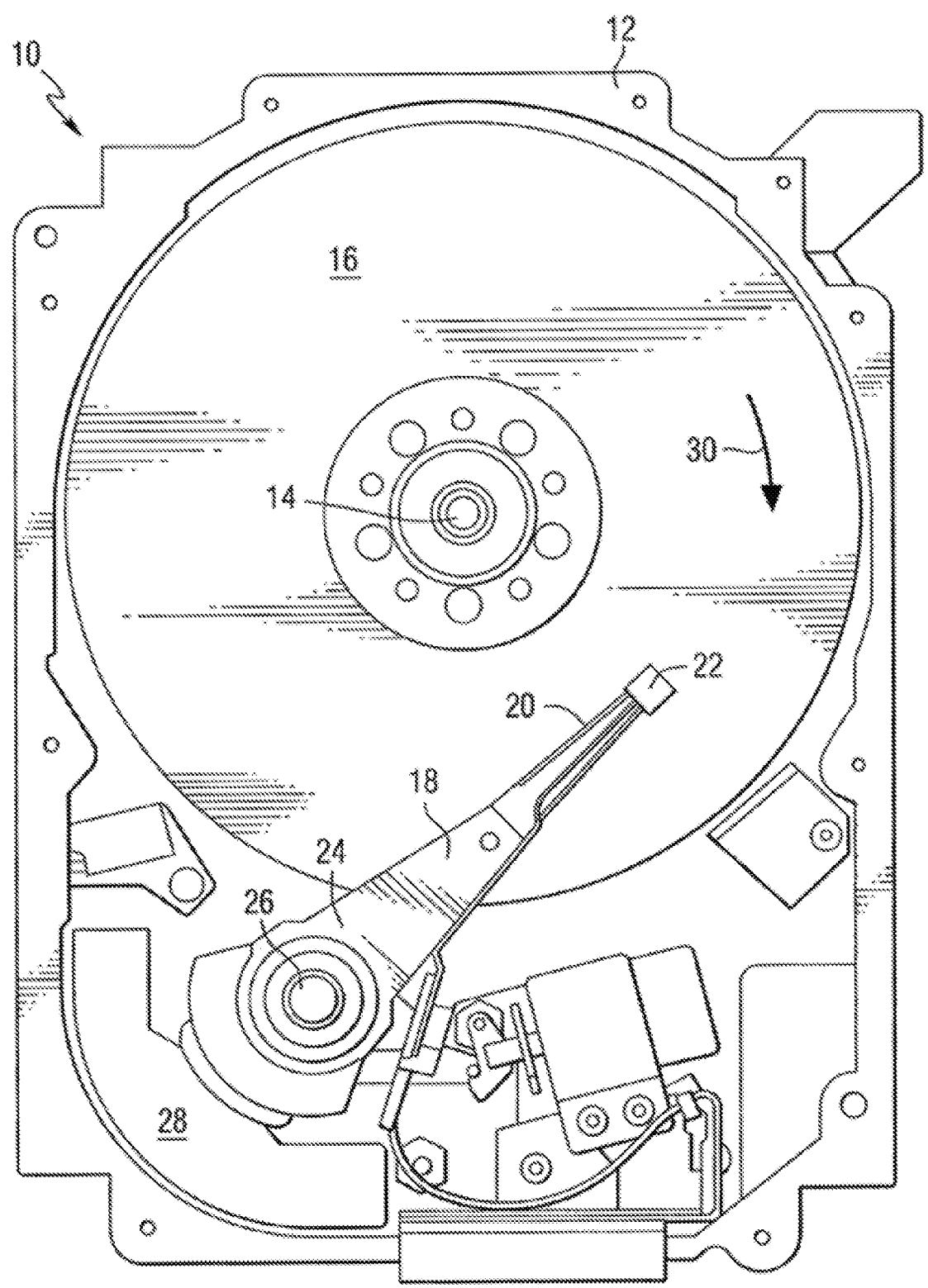
FIG. 1 is a schematic diagram of an example of a portion of a device in accordance with various aspects of this disclosure.

FIG. 1 depicts a data storage device in an exemplary form of a disk drive 10 including a recording head constructed in accordance with an aspect of the present techniques. The storage device includes a housing 12 (with the upper portion removed and the lower portion visible in this view) sized and configured to contain the various components of the disk drive. The disk drive includes a spindle motor 14 for rotating at least one data storage medium 16 (e.g., a magnetic disk) within the housing. At least one arm 18 may be contained within the housing 12, with each arm 18 having a first end 20 and a second end 24. In some cases, the first end 20 may include a recording head 22 (e.g., recording/writing head, a reading head, a reading/recording head, slider with a reading/recording head, etc.). In some cases, a second end 24 may be pivotally mounted on a shaft by a bearing 26. An actuator motor 28 may be located at the arm's second end 24 for pivoting the arm 18 about a pivot point to position the recording head 22 over a desired sector of the storage medium 16. The actuator motor 28 is controlled by a controller that is not shown in this view and is well-known in the art. The storage medium rotates in the direction indicated by arrow 30. As the disk rotates, recording head 22 may be configured to fly over a surface of storage medium 16 on an air bearing between recording head 22 and the surface of storage medium 16.

For heat assisted magnetic recording (HAMR), an electromagnetic wave of, for example, visible, infrared or ultraviolet light may be directed onto a surface of storage medium 16 to raise the temperature of a localized area on a surface of storage medium 16 to facilitate switching of the magnetization of that area. The recording head 22 may include a HAMR recording head (e.g., HAMR recording/writing head, a HAMR reading head, a HAMR reading/recording head, slider with a HAMR reading/recording head, etc.). Some designs of HAMR recording heads include a thin film waveguide on a slider (e.g., slider of recording head 22) to guide light to the storage medium for localized heating of the storage medium. To launch light into the waveguide, a grating coupler may be used.

In some examples, the storage medium 16 may include a magnetic recording layer, a carbon overcoat layer, and a lubricant layer. In some cases, the present techniques include depositing a lubricant solution on an outer surface of storage medium 16. In some cases, the lubricant solution may include at least a disk surface lubricant and dielectric.

Figure 2:
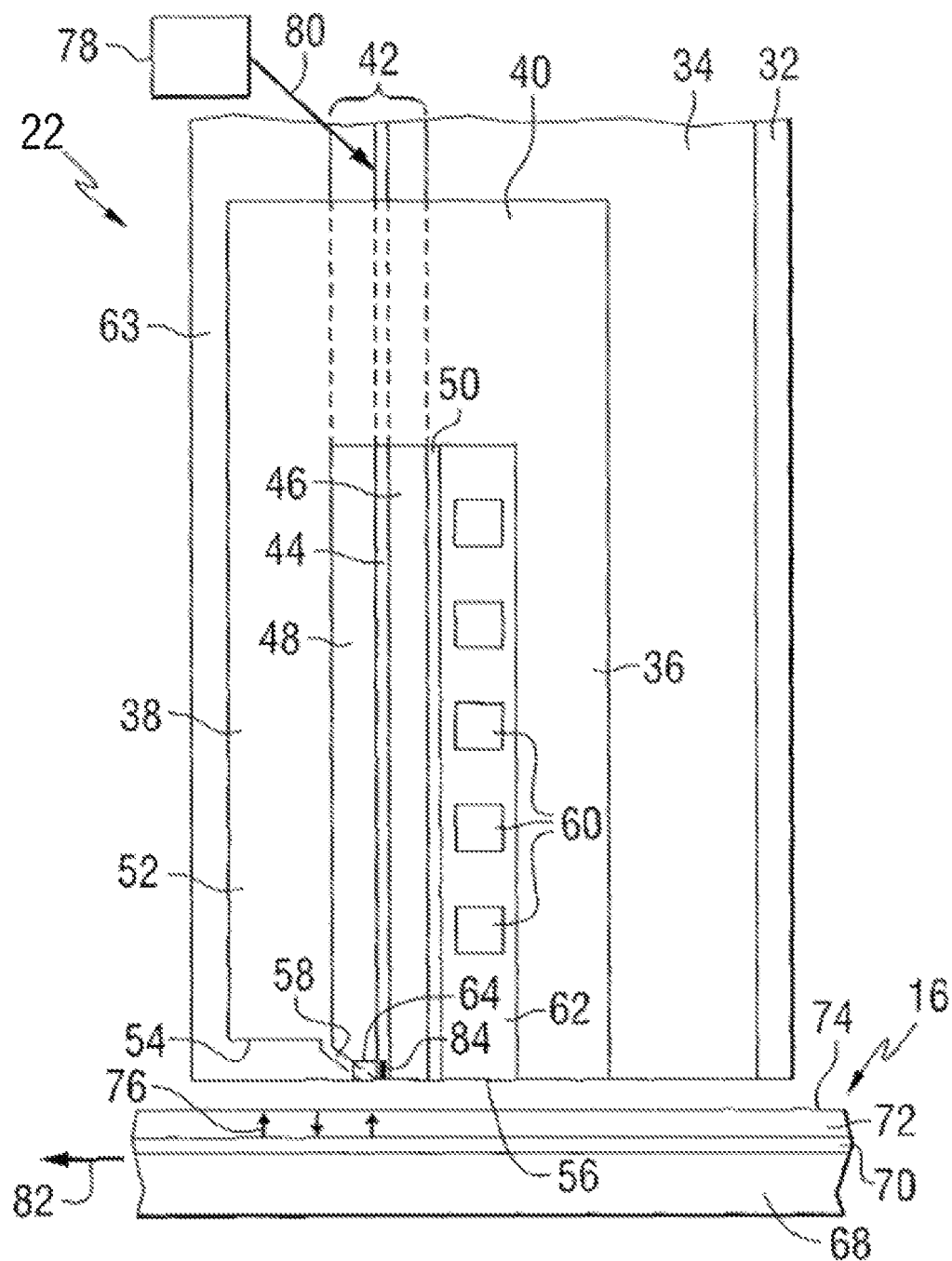
FIG. 2 shows a schematic diagram of a portion of a device in accordance with various aspects of this disclosure.

FIG. 2 is a side elevation view of a recording head 22 constructed in accordance with an aspect of the disclosure, and positioned near storage media. The recording head 22 includes a substrate 32, a base coat 34 on the substrate, a bottom pole 36 on the base coat, and a top pole 38 that may be magnetically coupled to the bottom pole through a yoke or pedestal 40. In the illustrated example, a waveguide 42 may be positioned between the top and bottom poles. The waveguide includes a core layer 44 and cladding layers 46 and 48 on opposite sides of the core layer. A mirror 50 may be positioned adjacent to one of the cladding layers. The top pole may be a two-piece pole that includes a first portion, or pole body 52, having a first end 54 that is spaced from the air bearing surface 56, and a second portion, or sloped pole piece 58 (also referred to as a write pole 58), extending from the first portion and tilted in a direction toward the bottom pole. The second portion may be structured to include an end adjacent to the air bearing surface 56 of the recording head, with the end being closer to the waveguide than the first portion of the top pole. A planar coil 60 may extend between the top and bottom poles and around the pedestal. In the illustrated example, the top pole may serve as a write pole and the bottom pole as a return pole.

In some cases, insulating material 62 may separate the coil turns. In one example, the substrate may be AlTiC, the core layer may be $Ta_2O_5$, and the cladding layers (and other insulating layers) may be $Al_2O_3$. A top layer of insulating material 63 may be formed on the top pole. A heat sink 64 may be positioned adjacent to the sloped pole piece 58. The heat sink may be comprised of a non-magnetic material, such as for example Au.

As illustrated in FIG. 2, the recording head 22 may include a structure for heating the magnetic storage medium 16 proximate to where the write pole 58 applies the magnetic write field H to the storage medium 16. In the illustrated example, the storage medium 16 includes a substrate 68, a heat sink layer 70, a magnetic recording layer 72, and a protective layer 74. However, other types of media, such as bit patterned media may be used. A magnetic field H produced by current in the coil 60 may be used to control the direction of magnetization of bits 76 in the recording layer of the media.

In the example, the storage medium 16 is positioned adjacent to or under the recording head 22. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 22. Light exits the end of the waveguide and heats a portion of the media, as the media moves relative to the recording head as shown by arrow 82. A near-field transducer (NFT) 84 is positioned in or adjacent to the waveguide and at or near the air bearing surface. The heat sink material may be chosen such that it does not interfere with the resonance of the NFT.

Although the example of FIG. 2 shows a perpendicular magnetic recording head and a perpendicular magnetic storage media, the present techniques may be used in conjunction with other types of recording heads and/or storage media where it may be desirable to concentrate light to a small spot. In some cases, the present techniques include depositing a dielectric on an NFT (e.g., NFT 84) to increase a SNR of a HAMR write operation.

Figure 3:
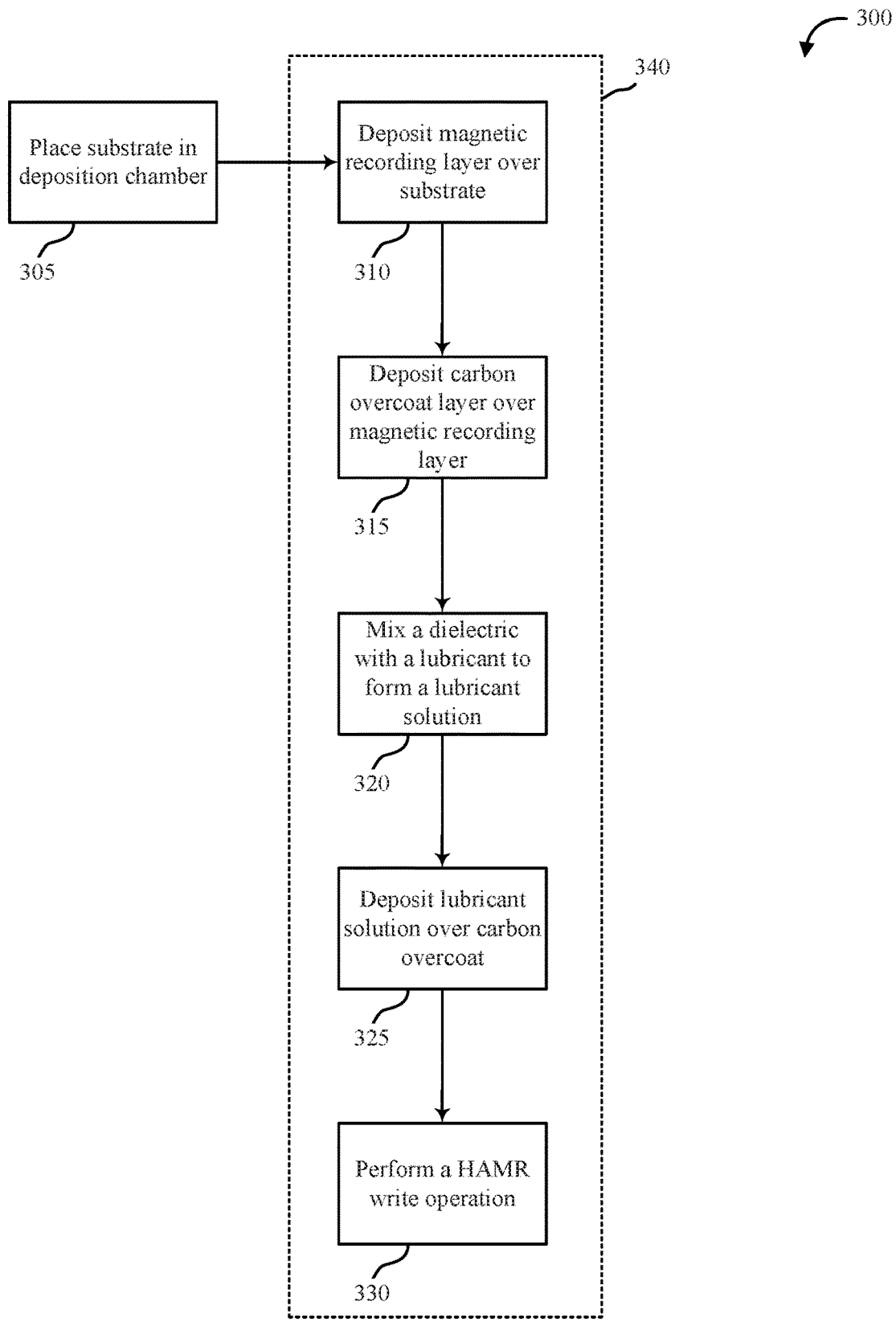
FIG. 3 shows a block diagram of a process in accordance with various aspects of this disclosure.

FIG. 3 shows a block diagram of a process 300 in accordance with various aspects of this disclosure.

At 305, a substrate (e.g., substrate 68) of a storage medium may be placed in a deposition chamber 340 (e.g., sputter deposition chamber, sputtering vapor deposition chamber, pulsed laser deposition chamber, etc.).

At 310, a magnetic recording layer (e.g., magnetic recording layer 72) may be deposited over the substrate within the deposition chamber 340 to further form the storage medium. In some cases, an environmental temperature (e.g., a set temperature within 32 degrees C. to 300 degrees C.) may be maintained within deposition chamber 340 while the magnetic recording layer is deposited at 310. In some cases, maintaining the set temperature may include maintaining a predetermined temperature within plus or minus 5 degrees Celsius (C), or within plus or minus 1 degree C., or within plus or minus a fraction of a degree C., etc.

At 315, a carbon overcoat (COC) layer may be deposited over the magnetic recording layer to further form the storage medium. In some cases, the same environmental temperature may be maintained within deposition chamber 340 while the magnetic recording layer is deposited at 310 and/or while the COC layer is deposited at 315.

At 320, a lubricant solution may be created. Creating the lubricant solution may include mixing a dielectric with a lubricant to create a liquid lubricant solution.

At 325, the lubricant solution may be deposited over the COC layer deposited at 315 to further form the storage medium. In some cases, the lubricant solution may be deposited while the substrate with the deposited magnetic recording layer and deposited COC layer remains in the deposition chamber 340. In some cases, the same environmental temperature may be maintained within deposition chamber 340 while the magnetic recording layer is deposited at 310, while the COC layer is deposited at 315, and while the lubricant solution is deposited at 325. Alternatively, a first environmental temperature (e.g., a set temperature within 32 degrees C. to 300 degrees C.) may be maintained within deposition chamber 340 while the magnetic recording layer is deposited at 310 and while the COC layer is deposited at 315, and a second environmental temperature different than the first environmental temperature may be maintained within the deposition chamber 340 while the lubricant solution is deposited at 325. In some cases, the lubricant solution may be deposited by dipping the storage medium in the lubricant solution after depositing the COC layer on the storage medium at 315, forming a coating of the lubricant solution on an outer surface of the storage medium.

At 330, a heat assisted magnetic recording (HAMR) write operation may be performed using a recording head with a laser. Performing the HAMR write operation may include shining the laser of the recording head on an outer surface of the storage medium (e.g., shining a laser on the coating of the lubricant solution on the outer surface of the storage medium). In some cases, shining a laser on the coating of the lubricant solution on the outer surface of the storage medium may heat up the coating. Heating up the coating may result in evaporating a portion of the dielectric in the coating of the lubricant solution. In some cases, the evaporation temperature of the dielectric may be lower than the evaporative temperature of the lubricant in the lubricant solution. Accordingly, heating up the coating of the lubricant solution may result in molecules of the dielectric evaporating sooner and/or at a higher rate than molecules of the lubricant in the lubricant solution. In some cases, evaporated molecules of the dielectric may accumulate on a near field transducer (NFT) of the recording head, thereby forming a film of the dielectric over the NFT.

Figure 4:
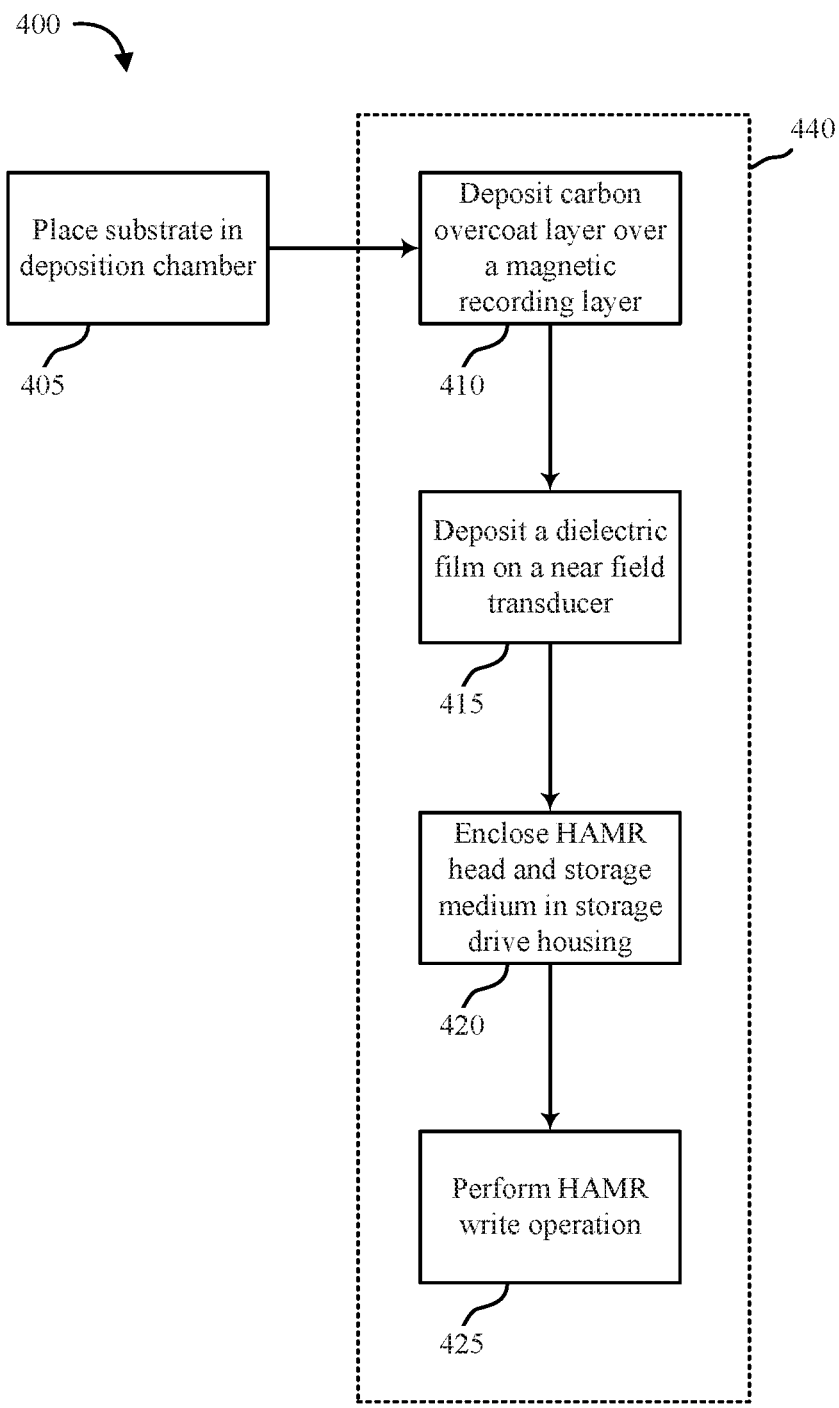
FIG. 4 shows a block diagram of a process in accordance with various aspects of this disclosure.

FIG. 4 shows a block diagram of a process 400 in accordance with various aspects of this disclosure.

At 405, a substrate (e.g., substrate 68) of a storage medium may be placed in a deposition chamber 440 (e.g., sputter deposition chamber, sputtering vapor deposition chamber, pulsed laser deposition chamber, etc.).

At 410, a carbon overcoat (COC) layer may be deposited over a magnetic recording layer to further form the storage medium. In some cases, a magnetic recording layer (e.g., magnetic recording layer 72) may be deposited over the substrate within the deposition chamber 440 before depositing the COC layer.

At 415, a dielectric film may be deposited over a near field transducer (NFT) of a heat assisted magnetic recording (HAMR) head. In some cases, the dielectric film may be deposited over the NFT before the HAMR head and the storage medium are enclosed in a storage drive housing. In some cases, depositing the dielectric film on the NFT before the storage medium is enclosed in a housing may be based at least in part on using a vacuum deposition chamber to deposit the portion of the dielectric film on the NFT while building the HAMR head. Additionally or alternatively, depositing the dielectric film on the NFT before the storage medium is enclosed in a housing may be based at least in part on depositing the dielectric film or depositing an additional portion of the dielectric film on the NFT as part of post processing of a surface of the HAMR head after building the HAMR head.

At 420, the HAMR head and storage medium may be enclosed in a storage drive housing. For example, the HAMR head and storage medium and other parts, which may include one or more storage controller chips, one or more circuit boards, etc., may be deposited in a storage drive housing. In some cases, before enclosing the HAMR head and storage medium in the storage drive housing, a dielectric may be deposited as a coating on an outer surface of the storage medium (e.g., in a liquid lubricant solution that includes a mixture of the dielectric and lubricant applied to an outer surface of the storage medium).

At 425, a HAMR write operation may be performed. In some cases, performing the HAMR write operation may evaporate dielectric in the coating on the outer surface of the storage medium. In some cases, the evaporated dielectric may accumulate on the dielectric film already deposited on the NFT at 415. In some cases, the dielectric of the dielectric film and the dielectric evaporated from the lubricant may be the same dielectric or different dielectrics. In some cases, a subsequent HAMR write operation may evaporate additional molecules of the dielectric in the coating on the outer surface of the storage medium, which may result in additional molecules of the evaporated dielectric accumulating on the dielectric film and/or the previous accumulation of evaporated dielectric.

Figure 5:
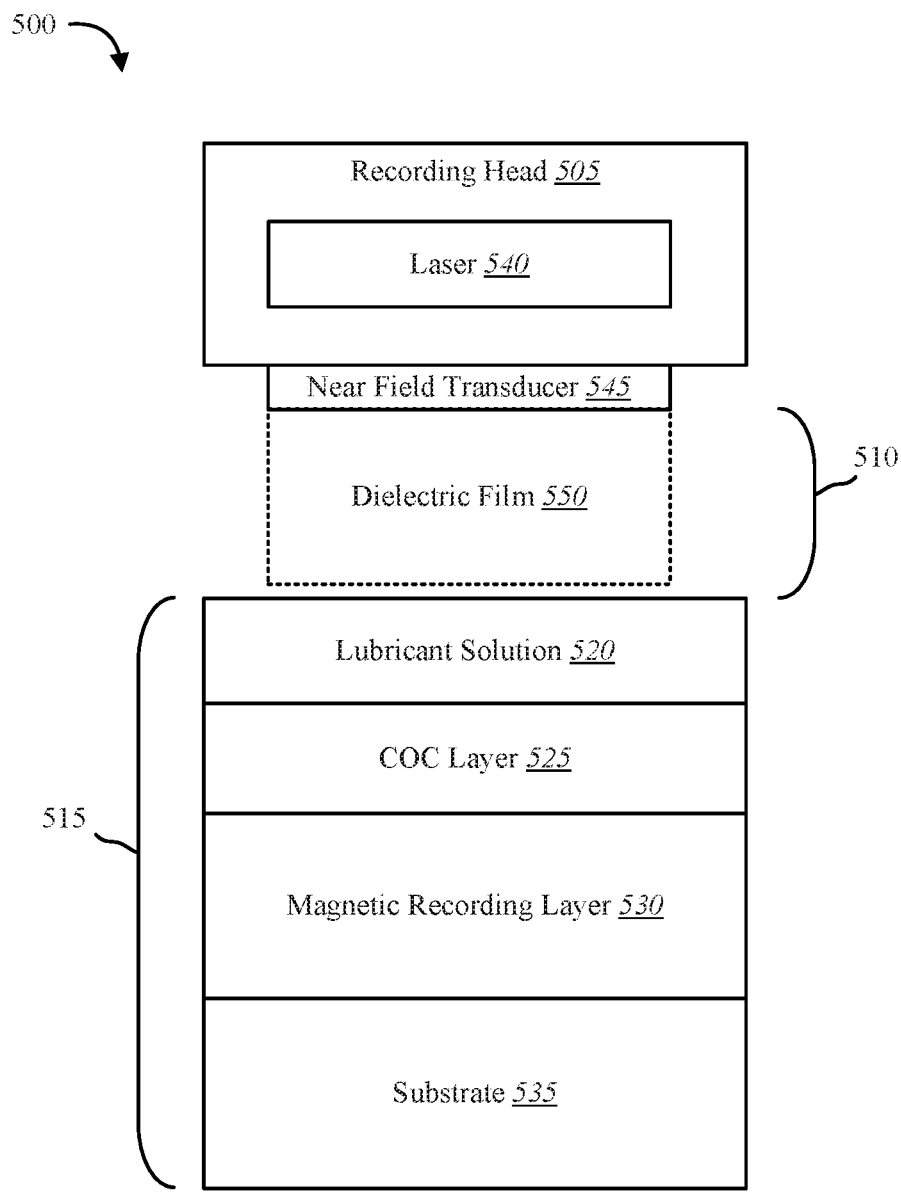
FIG. 5 shows a block diagram of media layers and a recording head in accordance with various aspects of this disclosure.

FIG. 5 shows a block diagram of environment 500 of a storage device (e.g., disk drive 10 of FIG. 1). Environment 500 may include a recording head 505 (e.g., HAMR recording head), air gap 510 (e.g., air bearing, advanced air bearing, head-to-media spacing, etc.), and storage medium 515. As shown, the storage medium 515 may include a lubricant solution 520, a carbon overcoat (COC) layer 525, a magnetic recording layer 530, a substrate 535 (e.g., substrate 68). As shown, the magnetic recording layer 530 may be deposited on substrate 535, the COC layer 525 on magnetic recording layer 530, and lubricant solution 520 on COC layer 525. As shown, recording head 505 may include a laser 540 and a near field transducer (NFT) 545 (e.g., NFT 84). As shown, air gap 510 may include a gap between NFT 545 and lubricant solution 520. In the illustrated example, recording head 505 may be an example of recording head 22 from FIG. 1 and/or FIG. 2. In some cases, storage medium 515 may be an example of storage medium 16 from FIG. 1 and/or FIG. 2. In some cases, magnetic recording layer 530 may be an example of magnetic recording layer 72 of FIG. 2.

In some examples, lubricant solution 520 may include at least a disk surface lubricant and a dielectric mixed together in a liquid solution deposited on an outer surface of storage medium 515 (e.g., on COC layer 525 in the illustrated example). In one example, storage medium 515 may be dipped into the liquid solution to deposit lubricant solution 520 on an outer surface of storage medium 515.

In some cases, molecules of a dielectric may be accumulated on NFT 545. As shown, dielectric film 550 may be deposited on NFT 545. As shown in the illustrated example, dielectric film 550 may extend from NFT 545 towards storage medium 515. In some cases, dielectric film 550 may fill up all of, relatively all of, or a majority of air gap 510 (e.g., space between NFT 545 and lubricant solution 520). In one example, a thickness of air gap 510 may range from about 0.1 nanometers (nm) to about 100 nm, and more particularly about 0.1 nm to about 10 nm. Thus, in some cases dielectric film 550 may range from about 0.1 nm to about 100 nm, and more particularly about 0.1 nanometers (nm) to about 10 nm.

In one example, dielectric film 550 may be deposited on NFT 545 in conjunction with building recording head 505. For example, dielectric film 550 may be deposited on NFT 545 while recording head 505 is being built. Additionally or alternatively, dielectric film 550 may be deposited on NFT 545 after building recording head 505 and before recording head 505 and storage medium 515 are enclosed in a storage device housing (e.g., housing 12).

In one example, dielectric film 550 may be deposited on NFT 545 in conjunction with performing one or more HAMR write operations. In some cases, the one or more HAMR write operations may include laser 540 shining on lubricant solution 520. In some cases, laser 540 shining on lubricant solution 520 may heat up lubricant solution 520 resulting in a portion of lubricant solution 520 evaporating. In some cases, a dielectric mixed in lubricant solution 520 may have a lower evaporative temperature than a disk surface lubricant in lubricant solution 520. Accordingly, when laser 540 heats up lubricant solution 520 the dielectric in lubricant solution 520 may evaporate (e.g., desorption) before the disk surface lubricant in lubricant solution 520 evaporates. In some cases, at least a portion of the evaporated dielectric may accumulate on NFT 545. In some cases, dielectric molecules from lubricant solution 520 may be evaporated each time a HAMR write operation is performed that includes shining laser 540 on lubricant solution 520.

In some examples, dielectric film 550 may be deposited on NFT 545 before performing a HAMR write operation. In some cases, each HAMR write operation that includes shining laser 540 on lubricant solution 520 may augment dielectric film 550. For example, a first HAMR write operation may result in additional dielectric accumulating on dielectric film 550 already deposited on NFT 545 before performing the first HAMR write operation. Additionally, each subsequent HAMR write operation may result in additional dielectric accumulating on dielectric film 550.

In some examples, dielectric film 550 may not be deposited on NFT 545 before performing a HAMR write operation. In some cases, dielectric film 550 may not be deposited on NFT 545 before recording head 505 and storage medium 515 are enclosed in a storage device housing (e.g., housing 12). In some cases, dielectric film 550 may first accumulate on NFT 545 based on a HAMR write operation after the storage medium 515 is enclosed in a storage drive housing.

For example, a first HAMR write operation that includes shining laser 540 on lubricant solution 520 may deposit an initial layer of dielectric film 550 on NFT 545 (e.g., by desorption of the dielectric in lubricant solution 520). Additionally, each subsequent HAMR write operation that includes shining laser 540 on lubricant solution 520 may result in additional dielectric accumulating on dielectric film 550. In some cases, the amount of dielectric that may be accumulated on NFT 545 may be limited by a span of air gap 510. For example, the thickness of the molecules of dielectric film 550 accumulated on NFT 545 may be limited by a size of air gap 510 between NFT 545 and lubricant solution 520 and/or COC layer 525 on the outer surface of the storage medium 515. For example, as dielectric film 550 extends from NFT 545 towards storage medium 515, dielectric film 550 eventually may make contact with an outer surface of storage medium 515 (e.g., lubricant solution 520 and/or COC layer 525) as storage medium 515 spins. Upon making contact, a portion of dielectric film 550 may be swept away from the spinning storage medium 515, thereby limiting the span of dielectric film 550.

In some examples, dielectric film 510 may be formed from a particular material composition. In some cases, the material composition of dielectric film 510 may include at least one of $SiO_2$, $Ta_2O_5$, $Nb_2O_5$, $ZrO_2$, $TiO_2$, MgO, AlN, GaN, $Si_3N_4$, SiON, TiON, $ZrO_2$, $Y_2O_3$, and yttria-stabilized zirconia ($ZrO_2/Y_2O_3$). In some cases, a refractive index n of the molecules of the dielectric film 510 may range from about 0.5 to about 3.0, and more particularly from 1.1 to about 2.0 based at least in part on the particular material composition used for the dielectric film 510 and a thickness of dielectric film (e.g., from about 0.1 nm to about 10 nm). In some cases, an extinction coefficient k of the molecules of dielectric film 510 may range from about 0.0 to about 2.0, and more particularly about 0.0 to about 1.0, based at least in part on the particular material composition used for dielectric film 510 and a thickness of dielectric film 510.

In some cases, an optical trap or magnetic trap may be used to deposit particles (e.g., microparticles, nanoparticles, etc.) to a desired location of a storage drive (e.g., to an NFT, etc.). In some cases, a magnetic field may be used to steer magnetic particles, where a gradient in the magnetic field results in a potential gradient and a force on the magnetic particle that steers the magnetic particle to a desired location of a storage drive (e.g., to an NFT, etc.). In some cases, a magnetic force may be based on at least one of a particle volume, susceptibility contrast, or field gradient, or any combination thereof.

In one example, an optical trap may be based on a laser beam (e.g., from laser 540). In some cases, a laser beam may provide an attractive or repulsive force to physically hold and move the particles to a desired location of the storage drive (e.g., onto a surface of a magnetic recording head). In some cases, a field gradient force and a scattering force of the laser (e.g., laser 540) may control the location of the particle. In some cases, the scattering force may depend on at least one of a photon flux or light intensity, a wavelength, a size of the particle, a refractive index contrast associated with the particle, etc. In some cases, the particle position may be determined by a ratio of the field gradient force to the scattering force. The field gradient force $F_{grad}$ may be defined as follows:

$$F_{grad} = -\frac{n_m^3 r_p^3}{2}\left(\frac{n_c^2-1}{n_c^2-2}\right)\nabla E^2$$

where $n_m$ is a medium index (e.g., refractive index of medium holding or encompassing the particle), $r_p$ is a particle radius (e.g., size of a particle), $n_c$ is the index of the particle (e.g., refractive index) divided by the index of the medium (e.g., $n_m$), and E is the energy of the laser (e.g., in Joules, etc.).

The scattering force $F_{scat}$ may be defined as follows:

$$F_{scat} = \frac{128\pi^5 r_p^6}{3\lambda^4}\left(\frac{n_c^2-1}{n_c^2+2}\right)\frac{n_m I_0}{c}$$

where $\lambda$ is the wavelength of the laser (e.g., laser 540), $r_p$ is a particle radius, nc is the index of the particle (e.g., refractive index) divided by the index of the medium (e.g., $n_m$), $n_m$ is a medium index, and $I_0$ is an optical intensity of the incident light of the laser.

In some cases, a dielectric (e.g., $SiO_2$) may be deposited on or near a magnetic recording head (e.g., based on an optical trap or magnetic trap). In some cases, the NFT may include a disk and a peg. Light may be absorbed by the disk and turned into a surface plasmon. This surface plasmon may travel along the outside edge of the disk and down the peg, heating a point on the storage media beneath the peg. In some cases, the width of the peg is the width of the hot spot on the storage media. In some cases, laser light (e.g., from laser 540) may be focused on a relatively small area of a storage medium, which may generate a relatively high gradient at the edges of the peg of the NFT. In some cases, the small size of the particles of dielectric, the focused area of light on the storage medium, and the relatively high index of the dielectric generate an attraction force on the dielectric particles (e.g., nanoparticles) based on the following formula:

$$R = \frac{F_{grad}}{F_{scat}} = \frac{3\sqrt{3}}{64\pi^5}\frac{n_m^2}{\left(\frac{n_c^2-1}{n_c^2+2}\right)}\frac{\lambda^5}{r^3 w_0^2}$$

where $\lambda$ is the wavelength of the laser (e.g., laser 540), $w_0$ is a focal spot size of the laser, $n_m$ is a medium index, $n_c$ is the index of the particle (e.g., refractive index) divided by the index of the medium (e.g., $n_m$), and r is a particle radius (e.g., $r_p$).

In some cases, the dielectric particles may be trapped between the NFT and the storage medium (e.g., between the peg and the medium), filling the air gap between the NFT and the storage medium. In some cases, the relatively high temperature of the NFT (e.g., of the peg) may sinter the dielectric particles, resulting in the particles coalescing into a solid mass and/or hardening on and/or around the NFT (e.g., on and/or around the peg, etc.).

In some cases, atoms of a material (e.g., a metalloid such as silicon) may be applied to one or more surfaces of a storage drive (e.g., to a surface of a storage medium, to a surface of the magnetic recording head, etc.). In one example, the atoms may be applied to a surface of the storage drive by wiping a tape containing the atoms across the surface. For example, a surface of tape or any sort of strip of material may include the atoms and this strip of material may be rubbed across a surface of the storage drive to apply the atoms (e.g., rubbed on a surface of a storage medium, on a surface of the magnetic recording head, etc.). In some cases, the tape or strip of material may include a dielectric (e.g., $SiO_2$) and the strip of material may be rubbed across a surface of the storage drive to apply the dielectric. In some cases, a dielectric may be applied or deposited (e.g., sputtered) on one or more surfaces of a magnetic recording head (e.g., on the NFT, on the peg of the NFT, etc.).

In some cases, atoms of a material (e.g., a metalloid such as silicon) may be mixed with a gas and/or liquid that at least partially fills up the volume of the air gap between the storage medium and the magnetic recording head. The gas and/or liquid may be in contact with the magnetic recording head and/or the storage medium. In some cases, the laser (e.g., laser 540) may induce decomposition/oxidation of the material in the gas and/or liquid (e.g., on or around the surface of the storage medium, on or around a surface of the magnetic recording head, etc.). In some cases, oxidation of the atoms may result in the formation of an oxidized form of the atoms (e.g., silicon atoms converted to $SiO_2$, etc.), which may be accumulated on the magnetic recording head (e.g., on the NFT, on the peg of the NFT, etc.) as described herein.

The build-up of material between the magnetic recording head and the storage medium reduces the transportation of corrosive gases that can corrode the surfaces of internal components of a storage drive (e.g., surfaces of the magnetic recording head, surfaces of the storage medium, etc.). Without the build-up of material between the storage medium and the magnetic recording head, corrosive gases are allowed to freely move between the magnetic recording head and the storage medium, accelerating magnetic recording head failure. The build-up of material blocks corrosive gas reaching the NFT (e.g., peg, etc.), reducing or eliminating peg oxidation and dielectric corrosion. In testing, air bearing surface (ABS) dielectric voiding (ADV) occurred where the build-up material was missing, while no ADV was observed for magnetic recording heads with build-up coverage (e.g., coverage of NFT, coverage of peg, coverage of pole on the magnetic recording head, coverage of core on the magnetic recording head, coverage of reader surface on the magnetic recording head, coverage of writer surface on the magnetic recording head, etc.). The build-up material may include $SiO_2$, TaO, NbO, TiO, SiO, AlO, etc.

Figure 6:
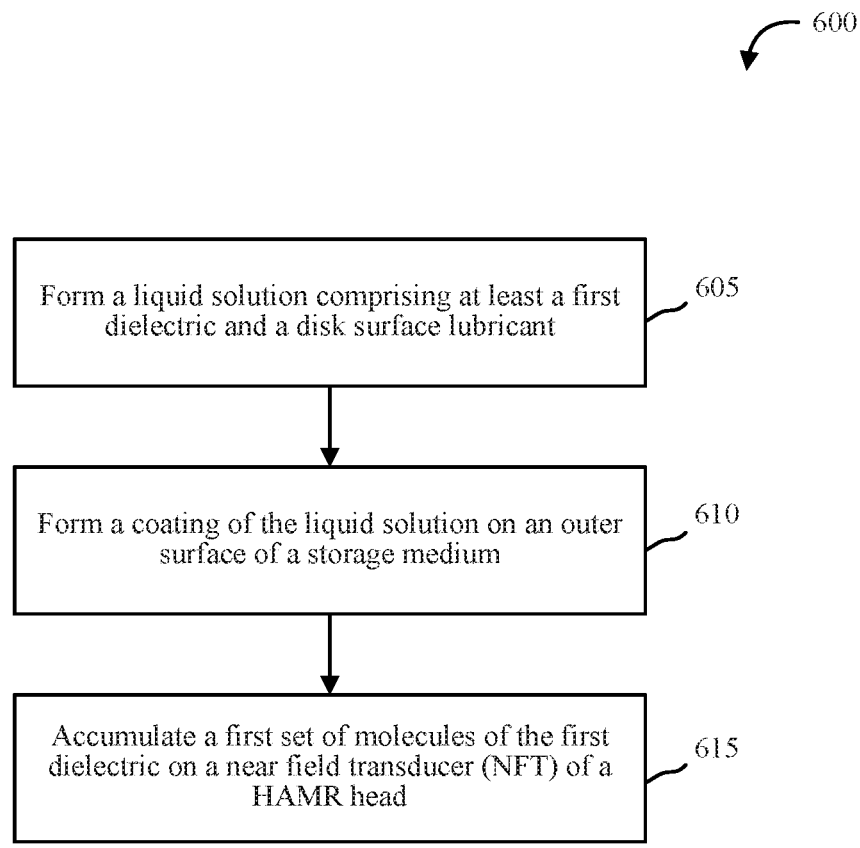
FIG. 6 is a flow chart illustrating an example of a method in accordance with various aspects of this disclosure.

FIG. 6 is a flow chart illustrating an example of a method 600 for coating a near field transducer in a dielectric material, in accordance with various aspects of the present disclosure. One or more aspects of the method 600 may be implemented in conjunction with disk drive 10 of FIG. 1, recording head 22 of FIG. 2, etc.

At block 605, the method 600 may include forming a liquid solution comprising at least a first dielectric and a disk surface lubricant.

At block 610, the method 600 may include forming a coating of the liquid solution on an outer surface of a storage medium. In some cases, the coating may be formed on the outer surface of the storage medium based at least in part on dipping the storage medium in the liquid solution.

At block 615, the method 600 may include accumulating a first set of molecules of the first dielectric on a near field transducer (NFT) of a HAMR head. In some cases, accumulating the first set of molecules of the first dielectric on the NFT may be based at least in part on evaporating a first portion of the first dielectric in the coating. In some cases, the first portion of the first dielectric on may be evaporated by performing a first HAMR writing operation. In some cases, the HAMR writing operation includes shining a laser on the coating that heats up the coating and results in the first portion of the first dielectric being evaporated.

Figure 7:
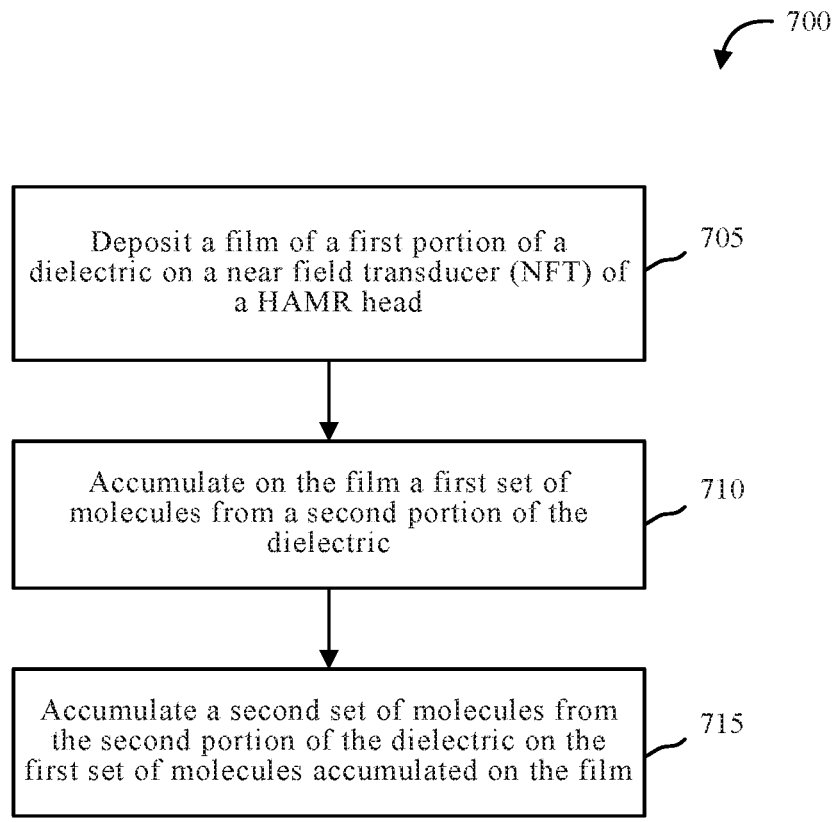
FIG. 7 is a flow chart illustrating an example of a method in accordance with various aspects of this disclosure.

FIG. 7 is a flow chart illustrating an example of a method 700 for coating a near field transducer in a dielectric material, in accordance with various aspects of the present disclosure. One or more aspects of the method 700 may be implemented in conjunction with disk drive 10 of FIG. 1, recording head 22 of FIG. 2, etc.

At block 705, the method 700 may include depositing a film of a dielectric on a near field transducer (NFT) of a HAMR head. In some cases, the method 700 may include depositing a film of a first portion of a dielectric on the NFT of the HAMR head before the HAMR head and a storage medium are enclosed in a storage drive housing.

At block 710, the method 700 may include accumulating on the film a first set of molecules from a second portion of the dielectric. In some cases, the first set of molecules from the second portion of the dielectric may be accumulated on the film based at least in part on evaporating the first set of molecules from the second portion of the dielectric when a first HAMR writing operation that shines a laser on a coating of the storage medium heats the second portion of the dielectric mixed into the coating.

At block 715, the method 700 may include accumulating a second set of molecules from the second portion of the dielectric on the first set of molecules accumulated on the film. In some cases, the second set of molecules from the second portion of the dielectric may be accumulated on the first set of molecules accumulated on the film at 710 based at least in part on performing a second HAMR writing operation that shines the laser on the coating of the storage medium and evaporates the second set of molecules from the second portion of the dielectric.

It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disk, as used herein, include any combination of compact disk (CD), laser disk, optical disk, digital versatile disk (DVD), floppy disk and Blu-ray disk where disks usually reproduce data magnetically, while disks reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein, but is to be accorded the broadest scope consistent with the principles and novel features disclose.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclose.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclose herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclose here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A heat assisted magnetic recording (HAMR) storage drive comprising:
   a storage medium;
   a coating on an outer surface of the storage medium comprising at least a first dielectric and a disk surface lubricant; and
   a near field transducer (NFT) of a HAMR head, a first set of molecules of the first dielectric accumulated on the NFT based at least in part on a first portion of the first dielectric in the coating being evaporated by a first HAMR writing operation that shines a laser on the coating, the first set of molecules of the first dielectric having a thickness that ranges from about 0.1 nm to about 10 nm.

2. The HAMR storage drive of claim 1, wherein a thickness of the first set of molecules of the first dielectric accumulated on the NFT is limited by an air gap between the NFT and the coating on the outer surface of the storage medium.

3. The HAMR storage drive of claim 1, further comprising:
   a second set of molecules of the first dielectric accumulated on the first set of molecules based at least in part on evaporating a second portion of the first dielectric in the coating by performing a second HAMR writing operation after the first HAMR writing operation.

4. The HAMR storage drive of claim 1, wherein a refractive index n of the first set of molecules of the first dielectric accumulated on the NFT ranges from about 1.1 to about 2.0; and wherein an extinction coefficient k of the first set of molecules of the first dielectric accumulated on the NFT ranges from about 0.0 to about 1.0 based at least in part on a material composition used for the first dielectric and a thickness of the first dielectric on the NFT.

5. The HAMR storage drive of claim 1, wherein the coating is formed on the outer surface of the storage medium based at least in part on dipping the storage medium in a liquid solution of the first dielectric and the disk surface lubricant, the forming of the coating occurring before the storage medium is enclosed in a housing of the HAMR storage drive.

6. The HAMR storage drive of claim 5, wherein the evaporating of the first portion of the first dielectric occurs after the storage medium is enclosed in the housing, and wherein a portion of the first dielectric or a second dielectric different from the first dielectric is deposited on the NFT before the storage medium is enclosed in the housing.

7. The HAMR storage drive of claim 6, wherein depositing the portion of the first dielectric or the second dielectric on the NFT before the storage medium is enclosed in a housing is based at least in part on using a vacuum deposition chamber to deposit the portion of the first dielectric or the second dielectric on the NFT while building the HAMR head, or depositing the portion of the first dielectric or the second dielectric on the NFT as part of post processing of a surface of the HAMR head after building the HAMR head, or both.

8. The HAMR storage drive of claim 6, wherein at least a portion of the first dielectric and the second dielectric is formed from a material composition comprising at least one of $SiO_2$, $SiO$, $Ta_2O_5$, $TaO$, $Nb_2O_5$, $NbO$, $ZrO_2$, $TiO_2$, $TiO$, $MgO$, $AlN$, $AlO$, $GaN$, $Si_3N_4$, $SiON$, $TiON$, $ZrO_2$, $Y_2O_3$, and yttria-stabilized zirconia ($ZrO_2/Y_2O_3$).

9. The HAMR storage drive of claim 1, wherein at least a portion of the first dielectric is accumulated on the NFT based at least in part on an optical trap generated by the laser or a magnetic trap generated by the HAMR head, or both.

10. A method to increase a signal to noise ratio of a heat assisted magnetic recording (HAMR) head, the method comprising:
   forming a liquid solution comprising at least a first dielectric and a disk surface lubricant;
   forming a coating of the liquid solution on an outer surface of a storage medium based at least in part on dipping the storage medium in the liquid solution; and
   accumulating a first set of molecules of the first dielectric on a near field transducer (NFT) of a HAMR head based at least in part on evaporating a first portion of the first dielectric in the coating by performing a first HAMR writing operation that shines a laser on the coating, the first set of molecules of the first dielectric having a refractive index n that ranges from about 1.1 to about 2.0 and an extinction coefficient k that ranges from about 0.0 to about 1.0 based at least in part on a material composition used for the first dielectric and a thickness of the first dielectric on the NFT.

11. The method of claim 10, wherein a thickness of the first set of molecules of the first dielectric accumulated on the NFT ranges from about 0.1 nm to about 10 nm.

12. The method of claim 10, wherein a thickness of the first set of molecules of the first dielectric accumulated on the NFT is limited by an air gap between the NFT and the coating on the outer surface of the storage medium.

13. The method of claim 10, comprising:
   accumulating a second set of molecules of the first dielectric on the first set of molecules accumulated on the NFT based at least in part on evaporating a second portion of the first dielectric in the coating by performing a second HAMR writing operation after the first HAMR writing operation.

14. The method of claim 10, wherein the forming of the coating occurs before the storage medium is enclosed in a housing of a storage drive.

15. The method of claim 14, wherein the evaporating of the first portion of the first dielectric occurs after the storage medium is enclosed in the housing.

16. The method of claim 10, comprising:
   depositing a portion of the first dielectric or a second dielectric different from the first dielectric on the NFT before the storage medium is enclosed in a housing.

17. A deposition apparatus for depositing films on heat assisted magnetic recording (HAMR) heads, the deposition apparatus configured to:
   deposit a film of a first portion of a dielectric on a near field transducer (NFT) of a HAMR head before the HAMR head and a storage medium are enclosed in a storage drive housing; and
   accumulate on the film a first set of molecules from a second portion of the dielectric based at least in part on performing a first HAMR writing operation that shines a laser on a coating of the storage medium and evaporates the first set of molecules from the second portion of the dielectric, the second portion of the dielectric being mixed into the coating, the first set of molecules from the second portion of the dielectric having a thickness that ranges from about 0.1 nm to about 10 nm.

18. The deposition apparatus of claim 17, the deposition apparatus further configured to:
   accumulate a second set of molecules from the second portion of the dielectric on the first set of molecules accumulated on the film based at least in part on performing a second HAMR writing operation that shines the laser on the coating of the storage medium and evaporates the second set of molecules from the second portion of the dielectric.

* * * * *